(12) United States Patent
Cuddihy et al.

(10) Patent No.: US 8,284,041 B2
(45) Date of Patent: Oct. 9, 2012

(54) METHOD AND APPARATUS FOR IN-VEHICLE PRESENCE DETECTION AND DRIVER ALERTING

(75) Inventors: Mark A. Cuddihy, New Boston, MI (US); Manoharprasad K. Rao, Novi, MI (US); Tai Luu, Westland, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 458 days.

(21) Appl. No.: 12/568,286

(22) Filed: Sep. 28, 2009

(65) Prior Publication Data

US 2011/0074565 A1    Mar. 31, 2011

(51) Int. Cl.
*B60Q 1/00* (2006.01)
(52) U.S. Cl. .................................................. 340/457
(58) Field of Classification Search .......... 340/457, 340/425.5, 425.28, 438, 573.1; 180/268, 180/271; 701/36
See application file for complete search history.

(56) References Cited

U.S. PATENT DOCUMENTS

| | | | |
|---|---|---|---|
| 3,814,877 A | 6/1974 | Alvarez | |
| 5,483,221 A | 1/1996 | Mutter et al. | |
| 6,078,854 A | 6/2000 | Breed et al. | |
| 6,362,734 B1 | 3/2002 | McQuade et al. | |
| 6,474,683 B1 | 11/2002 | Breed et al. | |
| 6,489,889 B1 | 12/2002 | Smith | |
| 6,501,374 B1 | 12/2002 | King et al. | |
| 7,012,533 B2 * | 3/2006 | Younse | 340/573.1 |
| 7,085,635 B2 | 8/2006 | Boman et al. | |
| 7,170,401 B1 | 1/2007 | Cole | |
| 7,271,712 B2 | 9/2007 | Rubel | |
| 7,348,880 B2 * | 3/2008 | Hules et al. | 340/522 |
| 7,353,088 B2 * | 4/2008 | Eagen et al. | 701/1 |
| 7,567,181 B1 * | 7/2009 | Davison | 340/573.1 |
| 8,054,203 B2 * | 11/2011 | Breed et al. | 340/931 |
| 2001/0042977 A1 | 11/2001 | Breed et al. | |
| 2002/0145516 A1 | 10/2002 | Moskowitz et al. | |
| 2002/0163426 A1 | 11/2002 | Moskowitz | |
| 2002/0188392 A1 | 12/2002 | Breed et al. | |
| 2003/0002690 A1 | 1/2003 | Breed et al. | |
| 2003/0136600 A1 | 7/2003 | Breed et al. | |
| 2003/0154009 A1 | 8/2003 | Basir et al. | |
| 2003/0160689 A1 | 8/2003 | Yazdgerdi | |
| 2003/0201894 A1 | 10/2003 | Li | |
| 2003/0222775 A1 * | 12/2003 | Rackham et al. | 340/457 |
| 2004/0039509 A1 | 2/2004 | Breed | |
| 2004/0155783 A1 | 8/2004 | Al-Sheikh | |
| 2006/0219459 A1 * | 10/2006 | Suzuki | 180/273 |
| 2009/0027188 A1 | 1/2009 | Saban | |
| 2009/0292528 A1 | 11/2009 | Kameyama | |

FOREIGN PATENT DOCUMENTS

JP          06-51785 A    2/1994

* cited by examiner

*Primary Examiner* — Phung Nguyen
(74) *Attorney, Agent, or Firm* — Frank A. MacKenzie; Brooks Kushman P.C.

(57) ABSTRACT

A system for alerting a responsible party to the presence of an occupant in a passenger compartment of a vehicle includes a vibration sensor detecting movement of an occupant, a microphone detecting sound made by the occupant, a processor configured to receive signals output from the vibration sensor and the microphone and to use a combination of the signals to determine whether the occupant is present, and an alerting device to provide an alert to the responsible party if the processor determines that the occupant is present. The microphone may also be used in a communication or voice-recognition command system. Two or more microphones may be used to locate the sound's source of origin.

20 Claims, 4 Drawing Sheets

METHOD AND APPARATUS FOR IN-VEHICLE PRESENCE DETECTION AND DRIVER ALERTING

BACKGROUND

1. Technical Field

The present invention relates to a method and system for alerting the driver (or other responsible party) to a situation where a child or other occupant may have been inadvertently left in a parked vehicle.

2. Background Art

It is possible for an inattentive or distracted vehicle driver to unintentionally leave an infant, young child, or other person in a parked vehicle. To prevent such an occurrence, it is therefore desirable to detect human occupancy in some or all of the vehicle seating positions, particularly in the rear seating row(s), and to provide an alert, reminder, and/or warning if the circumstances indicate that the driver has inadvertently left an occupant behind in the parked vehicle.

Systems have been proposed to address this concern; however none have provided an optimum solution. A detection and alerting system should ideally not be prone to false detections since this will result in a high number of false warnings to the driver which may, over time, cause the driver to disregard the warning altogether. Weight-based occupant detection systems have failed this test, since they cannot discern between a human occupant and any type of cargo sitting on the weight sensor.

Vision systems have also been proposed to detect human occupants. Although the cost and size of CMOS cameras has significantly improved in recent years, the processing power required to interpret the video and accurately detect human occupants is significant. The identification of live occupants using video is non-trivial, and covering multiple seating positions with a camera while detecting the infinite visual scenarios and lighting conditions presented by children in the rear seat (i.e. lying down on the seat, covered by a blanket, etc.) has proved to be an elusive task. It is also challenging for a video system to discern between an empty child seat left in the vehicle and a child seat that contains a small infant. Various template matching methodologies have been proposed but have not been successful due to the above reasons.

Accelerometers capable of detecting low-level vibrations have been proposed to identify occupant movement and heart rate, but they must be mounted to the vehicle floor pan or other structural member(s). Such sensors may be adequate for intruder detection, but for seat occupant detection they may be too far removed from the occupants to sense smaller occupants and assign them to unique seating positions. Essentially, the signal-to-noise ratio obtained from accelerometers for smaller occupants does not facilitate robust identification.

It has been proposed to position high-sensitivity sensors of various types in or on a vehicle component that is contacted by the driver to detect movement and/or heart rate in order to monitor the health and/or alertness of a driver. See, for example, U.S. Pat. No. 7,482,938.

SUMMARY

The present invention provides a system and a method for detecting the presence of a vehicle occupant that may have been unintentionally left in a parked vehicle, and alerting the vehicle operator or other responsible party to the presence of the occupant.

According to an embodiment of the invention, a system comprises at least one vibration sensor disposed in the vehicle passenger compartment and configured to detect movement of the occupant and output signals related to the sensed movement, at least one microphone disposed within the passenger compartment and configured to detect sound made by the occupant and output signals related to the sensed sound, a processor configured to receive the signals output from the vibration sensor and the microphone and to use a combination of the vibration sensor and the microphone signals to determine whether the occupant is present in the passenger compartment, and an alerting device configured to provide an alert to the responsible party if the processor has determined that the occupant is present in the passenger compartment.

According to another embodiment of the invention, a system for alerting a responsible party to the possibility that an occupant has been inadvertently left in a passenger compartment of a vehicle comprises a plurality of vibration sensors disposed in the passenger compartment adjacent a plurality of defined seating positions and detecting movement of an occupant of the defined seating positions and outputting signals related to the sensed movements; a plurality of microphones disposed within the passenger compartment and detecting sounds made by any one or more of the occupants of the seating positions and outputting signals related to the sensed sounds; a plurality of door sensors monitoring an open/closed status of a plurality of doors of the vehicle and outputting signals related to the open/closed status; at least one powertrain sensor monitoring a condition of a vehicle powertrain and outputting signals related to the powertrain status; a processor using the signals output from the vibration sensors and the microphones to determine an occupancy status of the passenger compartment, the occupancy status including a total number of occupants and which of the seating positions is occupied, and the processor further using the signals from the door sensors and the powertrain sensors to determine that the vehicle is in a parked condition; and an alerting device providing an alert to the responsible party when the processor has determined that the occupant is present in the passenger compartment and that the vehicle is in the parked condition.

According to another embodiment of the invention, a method for detecting the presence of an occupant in a passenger compartment of a vehicle and alerting a responsible party of the presence of the occupant comprises sensing motion of the occupant in the passenger compartment using a vibration sensor, sensing sounds in the passenger compartment, generating signals related to the sensed motions and sounds, processing the signals to determine whether the sensed motions and sounds indicate that the occupant is present in the passenger compartment, and alerting the responsible party if the processed signals indicate that the occupant is present in the passenger compartment.

BRIEF DESCRIPTION OF THE DRAWINGS

The present invention will hereinafter be further explained by means of non-limiting examples with reference to the appended Figures where.

It should be noted that the drawings have not necessarily been drawn to scale and that the dimensions of certain features may have been exaggerated for the sake of clarity.

DETAILED DESCRIPTION

Figure 1:
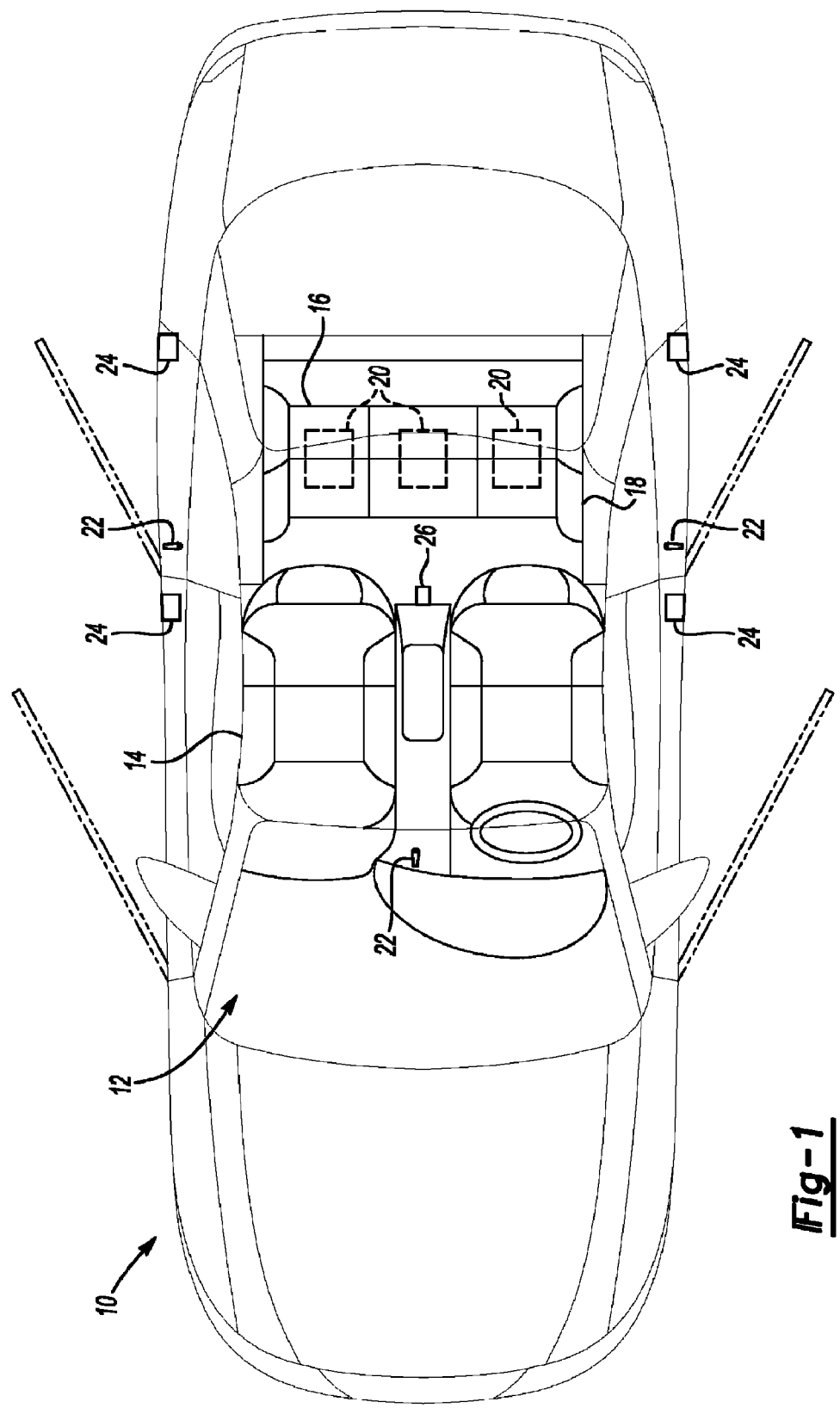
FIG. 1 is a schematic top view of a vehicle equipped with a system according to an embodiment of the invention.

FIG. 1 shows a vehicle 10 comprising a passenger compartment 12 having a front seating row 14 and a rear seating row 16. The rear seating row is shown to comprise a bench seat 18 extending across the width of the passenger compartment. Three vibration sensors 20 are arrayed across the bench seat in positions which generally correspond to the three defined seating positions of the seat. The defined seating positions may coincide with seating surface contours and/or the presence of occupant restraint belts (not shown).

Vibration sensors 20 are preferably generally flat and flexible enough that they may be integrated into the seat bottom without impairing the comfort of the seat. They may be disposed atop the surface of the seat bottom or may be embedded some distance below the surface of the seat bottom. Alternatively or in addition to being in or on the seat bottom, vibration sensors 20 may be provided elsewhere in relation to one of more defined seating position, for example in the seat back portion of the bench seat. Vibration sensors 20 should be located so as to be effective in detecting vibrations produced by an infant or small child that is secured in a baby/child seat that is in turn secured within the vehicle in a defined seating position.

A known type of vibration sensor suitable for use in the present invention is a flexible electret sensing mat. Such sensors comprise a pair of thin, sheet-like electrodes separated by a polymer (such as polypropylene) film that contains electrically charged pockets. The mat generates a small electric charge when subjected to compression or expansion. They are extremely sensitive to vibrations, and are capable of reliably detecting vibrations of extremely small magnitude, such as those caused by a human heartbeat. It is alternatively possible to employ a single vibration sensor of sufficient size and sensitivity to detect vibrations caused by an occupant located in or near any of the seating positions of rear seating row.

It is to be understood that the present invention may be practiced in relation to a passenger vehicle having any number of seating rows and/or seating positions, and that the example vehicle configuration shown in FIG. 1 is used merely for convenience of description.

One or more microphones 22 are disposed within the passenger compartment. Preferably, at least two microphones 22 are used and are spaced from one another, for reasons to be described below.

One or more of the microphones 22 may be utilized in a vehicle occupant communication system. For example, a hands-free telecommunication and/or voice-recognition control system (such as SYNC) may utilize a microphone located near the driver/operator of the vehicle.

Door condition sensors 24 are provided for each passenger compartment door, the sensors outputting signals indicating whether their respective door is open or closed. A temperature sensor 26 may also be provided to monitor ambient temperature within the passenger compartment.

Figure 2:
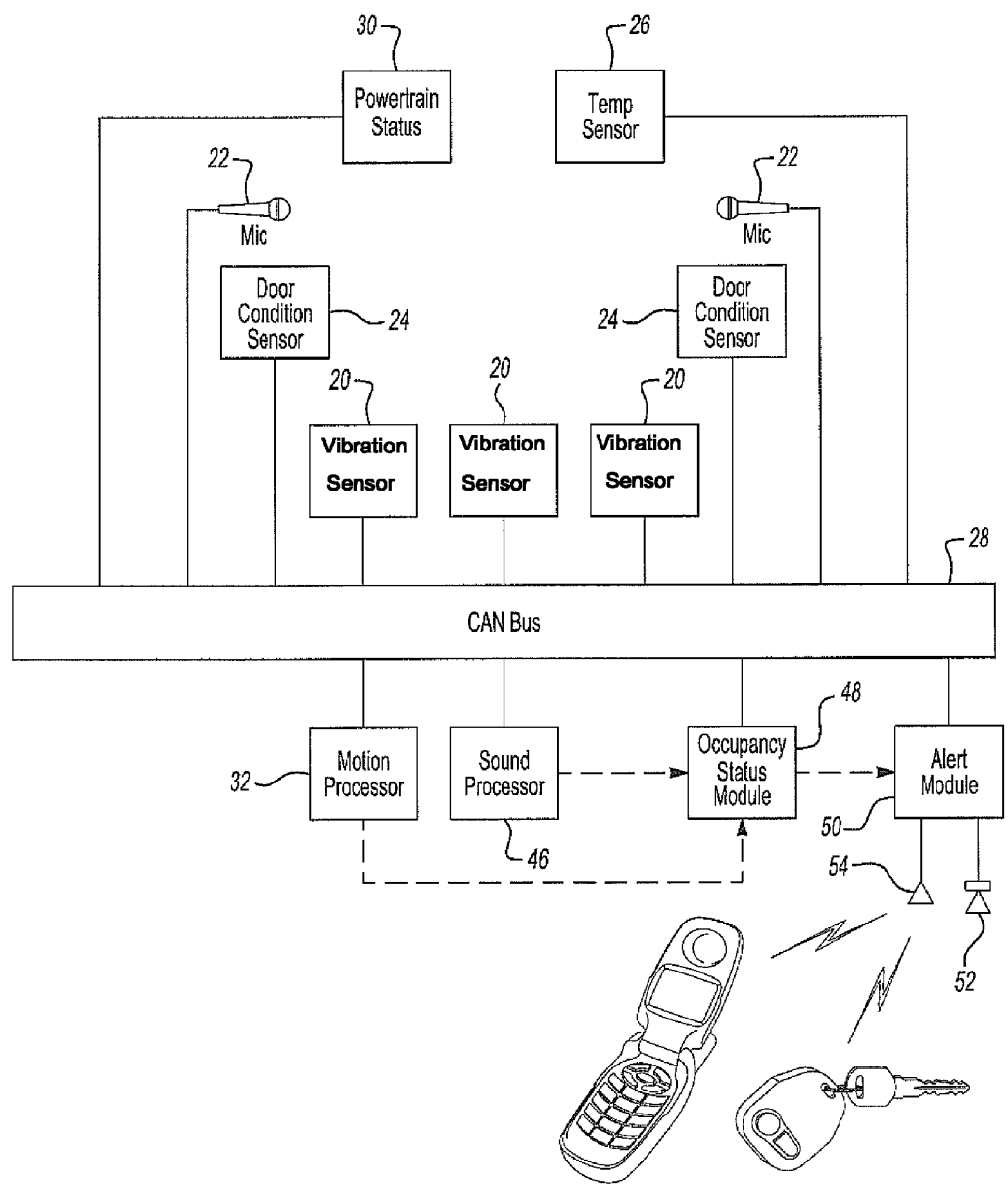
FIG. 2 is simplified schematic block diagram of an embodiment of the invention system.

Referring now to FIG. 2, a simplified schematic block diagram shows an embodiment of the system in which an vehicle electronic communication network, for example a CAN bus 28, is used to achieve communication between the various components. Vibration sensors 20 output signals related to any sensed movement at their respective seating positions. Microphones 22 output signals related to sounds sensed in the passenger compartment.

Powertrain status sensors (PSS) 30 monitor one or more indicia of the condition of a vehicle powertrain that indicate whether the vehicle is in a driving mode or a parking mode. For example, for a vehicle powered by an internal combustion engine the PSS may monitor the ON/OFF status of an ignition switch (not shown) and/or the PARK/DRIVE status of a transmission. For a vehicle powered by an electric motor, the PSS may monitor the ON/OFF status of the motor. In any case, the PSS outputs signals that will allow determination of whether the vehicle motor is off, and so the vehicle may be considered to be parked.

Signals output by all of the sensors are transmitted over CAN bus 28 utilizing a high-speed communication protocol, as is well known in the art, by means of which those signals may be received by any other component connected with the bus. In an alternate embodiment of the invention, the vibration sensors 20 may be directly connected to motion processor to reduce the transmission needs of the communication network.

Figure 3:
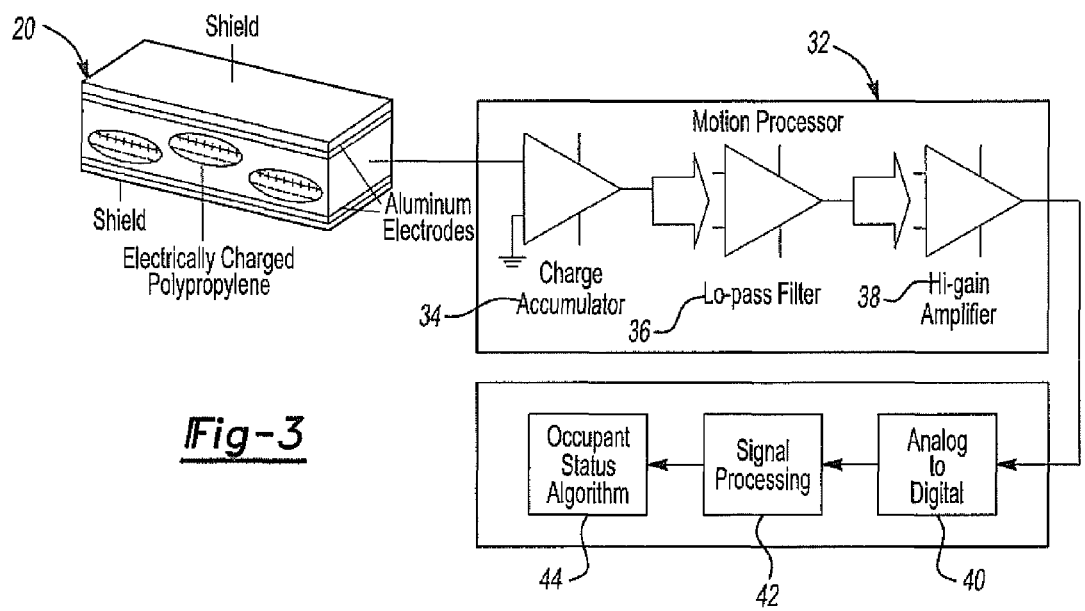
FIG. 3 is simplified schematic block diagram of an embodiment of a motion processor that may be used in conjunction with the invention.

Motion processor 32 receives electrical signals output by the vibration sensor(s) 20 and processes those signals as necessary to determine whether any detected vibration is caused by a human being in any of the seating positions. FIG. 3 is a schematic diagram of one possible embodiment of a motion processor 32. Electrical signals generated by vibration sensors 20 are sent to a signal conditioner which includes a charge accumulator 34, a low-pass filter 36, and a high-gain amplifier 38. Such processing steps may be necessary to discriminate between seat occupant motion (voluntary or involuntary) and other extraneous vibrations caused, for example, by the vehicle moving over a road surface or the parked vehicle being moved by the wind. The signal is passed to an analog-to-digital converter 40 and, if necessary, additional signal processing 42 may be performed before the signal is analyzed by an occupant status algorithm 44. The occupant status algorithm 44 determines which of the seating positions is occupied by a human, and this output is transferred to CAN bus 28 as necessary for subsequent steps in the process. The seat occupancy determination may be expressed in various ways, such as a probability, a percent certainty, and/or a value usable by a fuzzy logic process.

Figure 4:
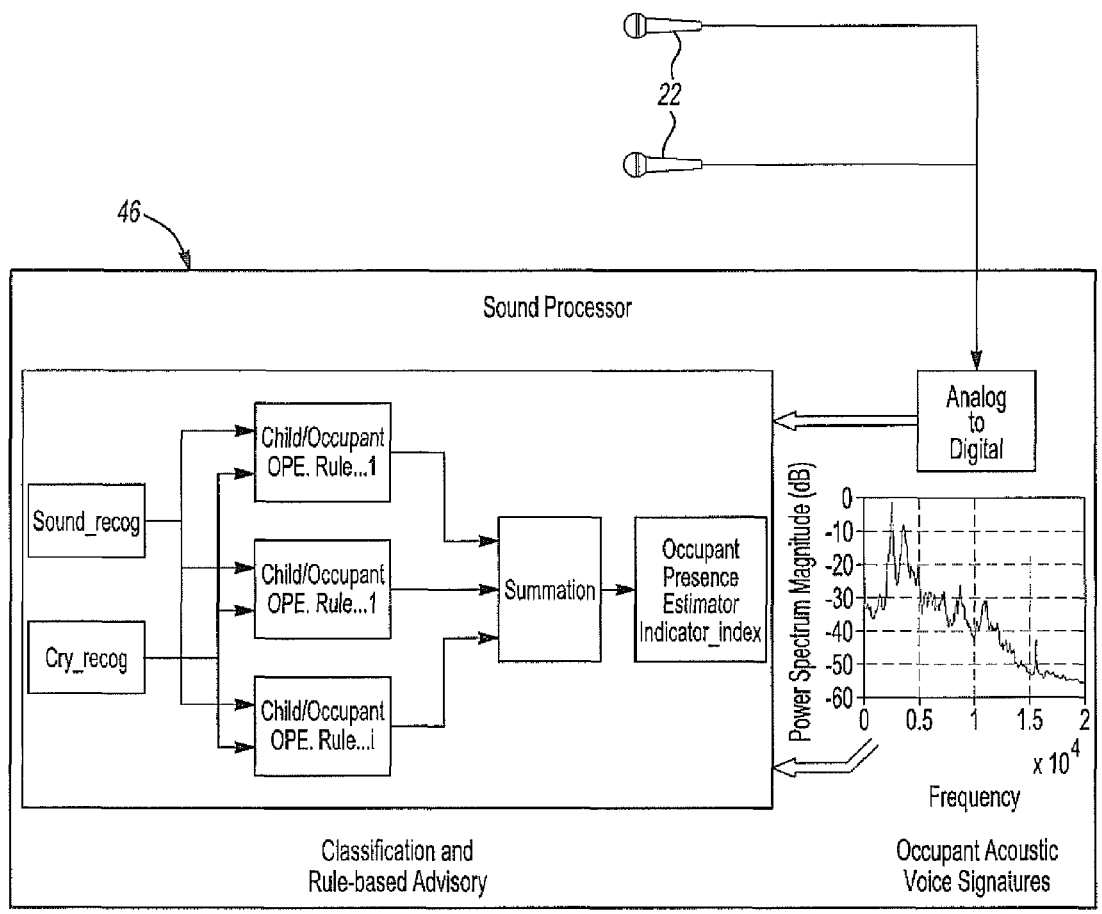
FIG. 4 is simplified schematic block diagram of an embodiment of a sound processor that may be used in conjunction with the invention.

Referring now to FIG. 4, a schematic diagram of one possible embodiment of a sound processor 46 is depicted. Sound processor 46 receives signals output by the microphones 22 and processes those signals as necessary to determine whether any detected sound is caused by a human occupant in the passenger compartment. Such processing steps may include filtering, amplifying, and/or analog-to-digital conversion of the output signals. The sound is transferred to a microprocessor, either contained within the existing SYNC system or a separate, external module for processing. First, the signal is converted into digital data for processing by a microprocessor. Frequency domain and time domain acoustic signatures of occupants are obtained in real-time and then sent to a rule-based classification algorithm for detection decision-making. If two or more microphones are utilized, acoustic data received at the separate microphones may be processed to determine a location of origin of a sound. For example, the different times-of-arrival of a sound at different microphones may be used to calculate the origin of the sound using triangulation. Other acoustic features, as characterized by the microphone output signals, may also be used, such as phase shifts.

Sound processor 46 may also perform processing steps that involve matching the sounds received by microphones 22 with known and/or stored acoustic voice signatures of occupant voices. For example, frequency domain and time domain acoustic signatures of occupant voices may be obtained during a particular vehicle trip or over a greater length of time. Pitch, spectral moments, cepstral coefficients and other appropriate digital sound signal processing parameters extracted from the voice signals may be used in signal analysis. The acoustic voice signal analysis outcomes are used in a rule-based classification algorithm to identify the voices of specific occupants, for example family members that use the vehicle frequently, for occupant detection decision-making. Sound processor 46 may employ neural networks to perform the required signal analysis and rule-based classification, as disclosed more fully in U.S. Pat. No. 7,353,088 B2, the disclosure of which is incorporated herein by reference.

It should be understood that the term "voice," as used herein, includes any vocal sound made by a human, to include any sounds that may be made by infants, such as crying, even if those sounds may not meet a formal definition of "speech."

The post-processing output of sound processor 46 should at least be a determination of whether or not a human-made sound has been detected in the passenger compartment. The output may further include the location of origin of one or more sounds and/or any correlation between a detected voice and a known/stored acoustic speech signature.

An occupant status module (OSM) 48 receives the signals output by motion processor 32 and sound processor 46 through either CAN bus 28 or a direct communication link as indicated by the dashed lines shown in FIG. 2. OSM 48 interprets the vibration and acoustic data contained in the sensor signals to determine, to a high degree of certainly, whether an occupant is present in the seating positions being monitored. It is also possible for OSM 48, given adequate sensor data, to determine the number and/or location of any occupants present in the vehicle. These determinations may be accomplished by means of context-based aggregation and combinational logic, in a manner well known in the art.

An alerting module 50 receives seat occupancy outputs from OSM 48, either through CAN bus 28 or through a direct electrical connection as indicated by the dashed line in FIG. 2. Alerting module 50 and/or OSM 48 also receive signals from door condition sensors 24 and powertrain status sensor 30 as further inputs to a alerting logic algorithm which determines if the driver or other responsible party should be notified of an occupant present in the vehicle after the vehicle is stopped and the doors are closed, indicating that the driver intends to leave the parked vehicle.

Figure 5:
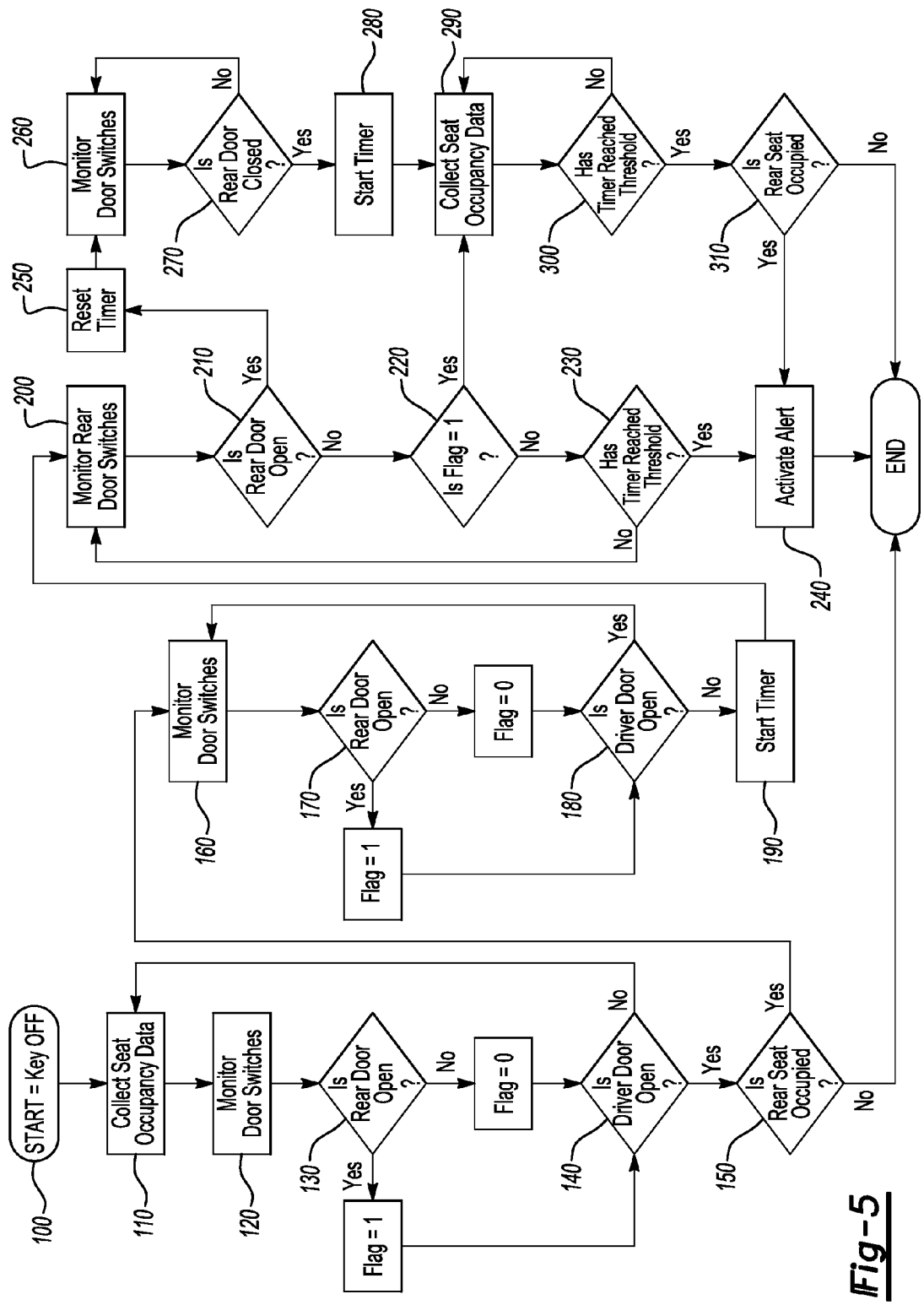
FIG. 5 is a flow diagram for an alerting algorithm according to an embodiment of the invention.

A flow diagram for such an alerting algorithm is shown in FIG. 5. In the algorithm it is assumed that occupancy monitoring is performed only for rear seating positions; however the same monitoring can be performed for front seat positions assuming the correct sensors are provided.

The algorithm starts at block 100 with the vehicle ignition "OFF," (or an equivalent condition, depending on the type of powertrain present in the vehicle) indicating that the vehicle is parked. Seat occupancy information for the seat(s) being monitored is collected from the vibration sensors 20 and microphones 22 at block 110. It should be noted that the vibration sensors 20 and microphones 22 may be utilized while the vehicle is operating (prior to being parked) to provide occupancy data to other vehicle systems, such as an occupant safety system or an entertainment system. At this point the vehicle is stationary and the engine is off, so that the vibration and sound processors will not be required to deal with extraneous signals from their respective sensors.

The system monitors door condition sensors 24 (120). First, the system sets a flag=1 if a rear door is open (130, YES), then checks whether the driver's door is open (140). If the driver's door has not yet been opened, the method returns to block 110.

Once the driver's door is determined to be open (140, YES), rear seat occupancy is checked (150). If NO, the routine ends. If the rear seat is occupied, door switches are again monitored (160) with a flag=1 set if a rear door is open (170). If the driver's door remains open (180, YES) the method returns to block 160. When the driver's door is closed (indicating that the driver has left the vehicle), a timer is started at block 190. The rear doors are then monitored (200) and if no rear door is open (210, NO) the flag value is checked (220). If flag=0 the timer is checked to see whether a threshold time has elapsed (230). The threshold time is selected to give the driver sufficient time to exit the vehicle, open a rear door, and assist a rear seat occupant out of the vehicle. When the threshold time has elapsed without the rear door being opened (230, YES), the alert is activated at 240. If the rear door is opened prior to the threshold time having elapsed (210, YES), the timer is reset to zero (250). The rear door switches are checked again at 260 and when the rear doors are closed (270, YES) the timer is started (280). Rear seating row occupancy is checked again (290) and when the threshold time has elapsed (300, YES), if the rear seats are occupied (310, YES) the alert is activated (240).

The alert may be in any form that will inform the driver or other responsible person of the rear seating row occupancy condition. The alert may be an audible signal produced by a vehicle-mounted speaker 52, or an antenna 54 may be used to transmit the alert to a receiving device (key fob, cell phone, Personal Digital Assistant (PDA), etc.) carried by the driver. If desired, a responsible person, service, or agency other than the driver may be alerted by a cell phone call, text message, or other means of wireless communication.

The alerts generated may escalate in frequency and/or intensity until the alerted party has responded in an adequate manner, such as by returning to the vehicle and opening a vehicle door. The alerts may also escalate in depending upon the ambient temperature detected by temperature sensor, with uncomfortably hot or cold temperatures calling for more frequent and/or more intense alerts.

While the best mode for carrying out the invention has been described in detail, those familiar with the art to which this invention relates will recognize various alternative designs and embodiments for practicing the invention as defined by the following claims.

The invention claimed is:

1. A system for alerting a responsible party to the presence of an occupant in a passenger compartment of a vehicle, the system comprising:
   at least one vibration sensor disposed in the passenger compartment and configured to detect movement of an occupant and to output signals related to the sensed movement;
   at least one microphone disposed within the passenger compartment and configured to detect sound made by the occupant and to output signals related to the sensed sound;
   at least one door sensor configured to monitor an open/closed status of at least one door of the vehicle and output signals related to the open/closed status;
   at least one powertrain sensor configured to monitor a condition of a vehicle powertrain and to output signals related to the powertrain condition;
   a processor configured to receive the signals output from the vibration sensor and the microphone and to use a combination of the vibration sensor signals and the microphone signals to determine whether the occupant is present, and the processor further configured to receive the signals output from the door sensor and the powertrain sensor and to use a combination of the door sensor signals and the powertrain sensor signals to determine whether the vehicle is in a parked condition; and an alerting device configured to provide an alert to the responsible party if the processor determines that the occupant is present and that the vehicle is in the parked condition.

2. The system of claim 1, wherein the at least one microphone comprises a first microphone and a second microphone disposed at separate locations in the passenger compartment, and the processor is further configured to determine a location of origin of sound made by the occupant on the basis of differences between the signals output by the first microphone and signals output by the second microphone.

3. The system of claim 1, wherein the at least one microphone serves as a component of a vehicle occupant communication system.

4. The system of claim 1, wherein the at least one vibration sensor comprises a plurality of vibration sensors located adjacent a respective plurality of defined seating positions and the processor is further configured to monitor occupancy status of the defined seating positions based upon the vibration sensor signals.

5. The system of claim 1, wherein the processor is further configured to distinguish between vocal patterns of different individuals present in the passenger compartment.

6. The system of claim 5, wherein the processor employs a neural network trained to distinguish between vocal patterns.

7. The system of claim 1, further comprising a temperature sensor monitoring an ambient temperature of the passenger compartment and outputting signals related to the ambient temperature, and the processor further configured to receive the signals output by the temperature sensor and to use the signals in determining whether to activate the alerting device.

8. The system of claim 7, wherein the processor uses the signals output by the temperature sensor to adjust at least one of an intensity, a frequency, and an escalation level of the alerts.

9. The system of claim 1, wherein the vibration sensor is a polymer-based electret vibration sensor positioned in a vehicle seat.

10. The system of claim 1, wherein the powertrain sensor monitors a PARK/Drive status of a transmission.

11. The system of claim 1, wherein the powertrain sensor monitors an ON/OFF status of an electric motor.

12. A system for alerting a responsible party that an occupant has been inadvertently left in a passenger compartment of a vehicle, the system comprising:
a plurality of vibration sensors disposed in the passenger compartment, each of the vibration sensors disposed adjacent a defined seating position and detecting movement of an occupant of the defined seating position and outputting signals related to the sensed movement;
a plurality of microphones disposed within the passenger compartment and detecting sounds made by any one or more of the occupants of the seating positions and outputting signals related to the sensed sounds;
a plurality of door sensors monitoring an open/closed status of a plurality of doors of the vehicle and outputting signals related to the open/closed status;
at least one powertrain sensor monitoring a condition of a vehicle powertrain and outputting signals related to the powertrain status;

a processor using the signals output from the vibration sensors and the microphones to determine an occupancy status of the passenger compartment, the occupancy status including a total number of occupants and which of the seating positions is occupied, and the processor further using the signals from the door sensors and the powertrain sensors to determine that the vehicle is in a parked condition; and an alerting device providing an alert to the responsible party when the processor has determined that the occupant is present in the passenger compartment and that the vehicle is in the parked condition.

13. A method for detecting the presence of an occupant in a passenger compartment of a vehicle and alerting a responsible party of the presence of the occupant, the method comprising:
monitoring an open/closed status of a door of the vehicle;
monitoring a status of a powertrain component;
processing signals related to the door open/closed status and to the powertrain status to determine that;
sensing motion of the occupant in the passenger compartment using a vibration sensor associated with a seating position in which the occupant is seated;
sensing sounds in the passenger compartment;
generating signals related to the sensed motions and sounds;
processing the signals to determine whether the sensed motions and sounds indicate that the occupant is present in the passenger compartment; and
alerting the responsible party if the processed signals indicate that the vehicle is in a parked condition and that the occupant is present in the passenger compartment.

14. The method of claim 13, wherein the step of sensing sound comprises sensing sound at least two separate locations in the passenger compartment, and the step of processing the signals comprises determining a sound origin location on the basis of differences between the sounds sensed at the at least two separate locations.

15. The method of claim 13, wherein the step of sensing sounds is performed by at least one microphone serving as a component of a vehicle occupant communication system.

16. The method of claim 13, wherein the step of sensing motion comprises monitoring a plurality of vibration sensors located adjacent respective plurality of defined seating positions, and the step of processing the signals further comprises monitoring occupancy status of the defined seating positions based upon the vibration sensor signals.

17. The method of claim 13, wherein the step of processing the signals comprises distinguishing between voice patterns of at least a first human being and a second human being present in the vehicle.

18. The method of claim 17, wherein the step of processing the signals comprises employing a neural network trained to distinguish between voice patterns.

19. The method of claim 13, further comprising:
monitoring an ambient temperature of the passenger compartment;
processing signals related to the ambient temperature; and
using the signals related to the ambient temperature to determine whether to activate the alerting device.

20. The method of claim 19, further comprising:
using the signals related to the ambient temperature to adjust at least one of an intensity, a frequency, and an escalation level of the alerts.

* * * * *